(12) United States Patent
Knickrehm et al.

(10) Patent No.: US 10,781,885 B2
(45) Date of Patent: Sep. 22, 2020

(54) ROPE CONNECTION SYSTEM, DEVICES, AND METHODS

(71) Applicant: Safeworks, LLC, Tukwila, WA (US)

(72) Inventors: Morgan Knickrehm, Kalispell, MT (US); Gregory Vincent Crew, Seattle, WA (US)

(73) Assignee: Safeworks, LLC, Tukwila, WA (US)

( * ) Notice: Subject to any disclaimer, the term of this patent is extended or adjusted under 35 U.S.C. 154(b) by 0 days.

(21) Appl. No.: 16/135,781

(22) Filed: Sep. 19, 2018

(65) Prior Publication Data

US 2019/0085940 A1   Mar. 21, 2019

Related U.S. Application Data

(60) Provisional application No. 62/560,925, filed on Sep. 20, 2017.

(51) Int. Cl.
| | | |
|---|---|---|
| *F16G 11/08* | (2006.01) | |
| *F16G 11/02* | (2006.01) | |
| *F16G 11/10* | (2006.01) | |

(52) U.S. Cl.
CPC .............. *F16G 11/08* (2013.01); *F16G 11/02* (2013.01); *F16G 11/103* (2013.01)

(58) Field of Classification Search
CPC ........ F16G 11/08; F16G 11/02; F16G 11/103; H01R 4/52; H01R 9/0503
See application file for complete search history.

(56) References Cited

U.S. PATENT DOCUMENTS

| | | | | |
|---|---|---|---|---|
| 2,434,358 A | * | 1/1948 | Frank ...................... | B21F 15/06 |
| | | | | 439/788 |
| 2,681,781 A | * | 6/1954 | Kellems ............... | H02G 3/0666 |
| | | | | 248/60 |
| 3,136,844 A | | 6/1964 | Petersen | |

(Continued)

FOREIGN PATENT DOCUMENTS

| | | |
|---|---|---|
| JP | 2899830 B2 | 6/1999 |
| KR | 10-1082257 B1 | 11/2011 |
| WO | WO 2004/087518 A1 | 10/2004 |

OTHER PUBLICATIONS

International Patent Application No. PCT/US2018/051819; Int'l Search Report and the Written Opinion; dated Jan. 11, 2019; 15 pages.

(Continued)

*Primary Examiner* — Robert Sandy
*Assistant Examiner* — Rowland Do
(74) *Attorney, Agent, or Firm* — BakerHostetler

(57) ABSTRACT

A device configured to join two ropes includes a device body that extends from a first end to a second end along a central axis, the device body including an inner surface defining a through hole that extends through both the first end and the second end, the device body defining an inner dimension. The device defines an unassembled configuration in which the first and second ropes are positioned outside the through hole and the inner dimension is smaller than both the first outer diameter and the second outer diameter. The device defines an assembled configured in which a portion of each of the first and second ropes are positioned in the through hole, and the inner dimension is greater than both the first outer diameter and the second outer diameter.

20 Claims, 2 Drawing Sheets

(56) References Cited

U.S. PATENT DOCUMENTS

| | | | | |
|---|---|---|---|---|
| 3,183,658 | A * | 5/1965 | Drinko | F16G 11/03 |
| | | | | 57/212 |
| 4,368,910 | A * | 1/1983 | Fidrych | D07B 1/18 |
| | | | | 24/115 N |
| 7,845,669 | B2 * | 12/2010 | Yeh | B60D 1/182 |
| | | | | 280/457 |
| 2005/0191910 | A1 * | 9/2005 | Bertini | H01R 13/523 |
| | | | | 439/676 |
| 2010/0102286 | A1 | 4/2010 | Jordan et al. | |
| 2012/0024119 | A1 * | 2/2012 | Aldy | H02G 1/00 |
| | | | | 81/486 |
| 2016/0248238 | A1 * | 8/2016 | Warren | H02G 3/0481 |

OTHER PUBLICATIONS

International Patent Application No. PCT/US2018/051819; Int'l Preliminary Report on Patentability; dated Oct. 28, 2019; 12 pages.

\* cited by examiner

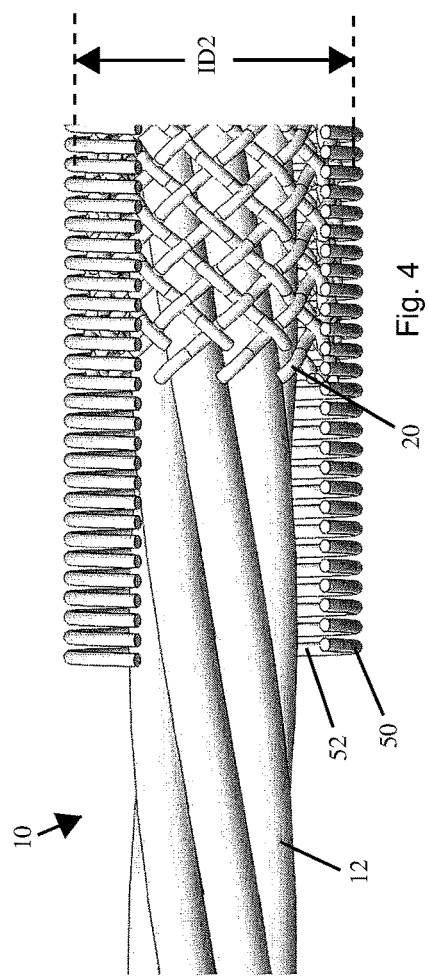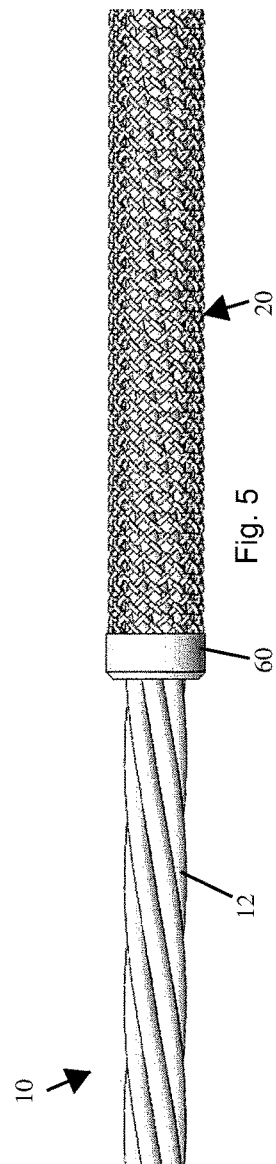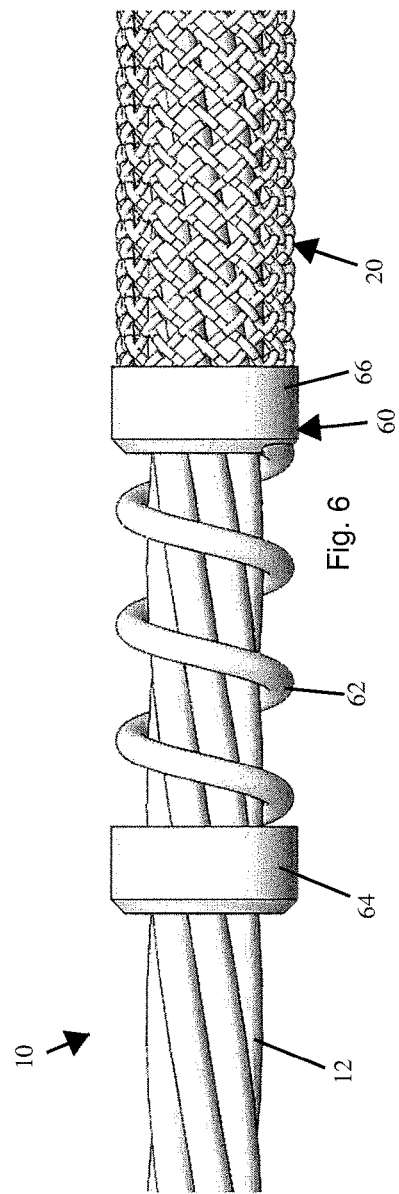

ROPE CONNECTION SYSTEM, DEVICES, AND METHODS

CROSS-REFERENCE

This application claims benefit under 35 U.S.C. § 119(e) of Provisional U.S. patent application No. 62/560,925, filed Sep. 20, 2017, the contents of which are incorporated herein by reference in their entirety.

TECHNICAL FIELD

The present disclosure relates generally to systems, devices, and methods configured to join a first rope and a second rope.

BACKGROUND

Devices and methods of joining two separate ropes to effectively form one longer rope are known. Existing rope splice technology includes long splices, short splices, swaged terminations, and spelter sockets using molten metal or a polymer. Factors to consider when determining the efficacy of a rope joining technology include ease of installation, strength, fatigue life, ability to inspect, and diametric increase. The existing rope splice technologies typically maximizes results in view of one factor while sacrificing results in one or more of the other categories.

BRIEF DESCRIPTION OF THE DRAWINGS

The foregoing summary, as well as the following detailed description of illustrative embodiments, is better understood when read in conjunction with the appended drawings. For the purposes of illustration, there is shown in the drawings exemplary embodiments; however, the present disclosure is not limited to the specific methods and instrumentalities disclosed. In the drawings:

FIG. 4 is a side elevation view of a portion of a rope connection system according to another embodiment;

FIG. 5 is a side elevation view of a portion of a rope connection system according to another embodiment; and FIG. 6 is a side elevation view of a portion of a rope connection system according to another embodiment.

DETAILED DESCRIPTION OF ILLUSTRATIVE EMBODIMENTS

Figure 1:
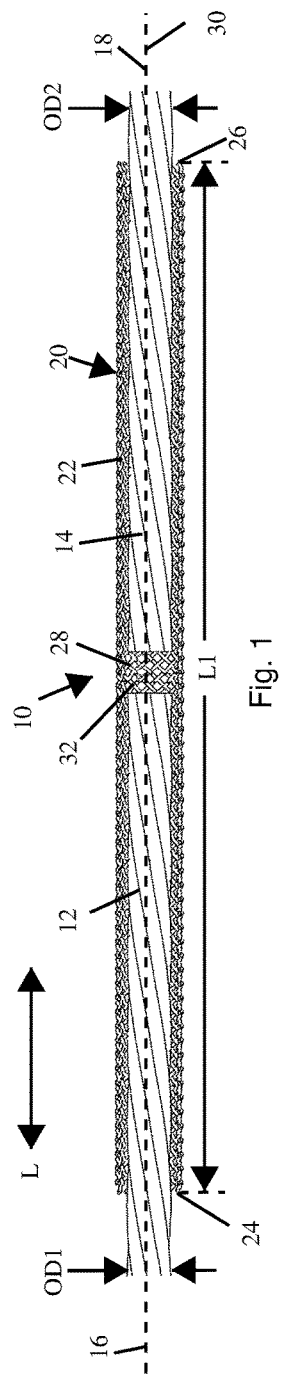
FIG. 1 is a side cross-sectional view of a rope connection system including a first rope, a second rope, and a rope connection device according to one embodiment.

The embodiments disclosed herein are not limited in application to the details of construction and the arrangement of components set forth in the following description or illustrated in the drawings. The disclosure is capable of other embodiments and of being practiced or being carried out in various ways. Also, the phraseology and terminology used herein is for the purpose of description and should not be regarded as limiting.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure. Certain features of the disclosure which are described herein in the context of separate embodiments may also be provided in combination in a single embodiment. Conversely, various features of the disclosure that are described in the context of a single embodiment may also be provided separately or in any subcombination.

A radial or polar coordinate system is provided and described herein. The polar coordinate system includes a two dimensional radial plane that is centered on and normal to a reference axis, for instance an axis of elongation or a central axis. The words "inner" and "outer" designate locations closer to and farther away from the reference axis respectively.

Figure 2:
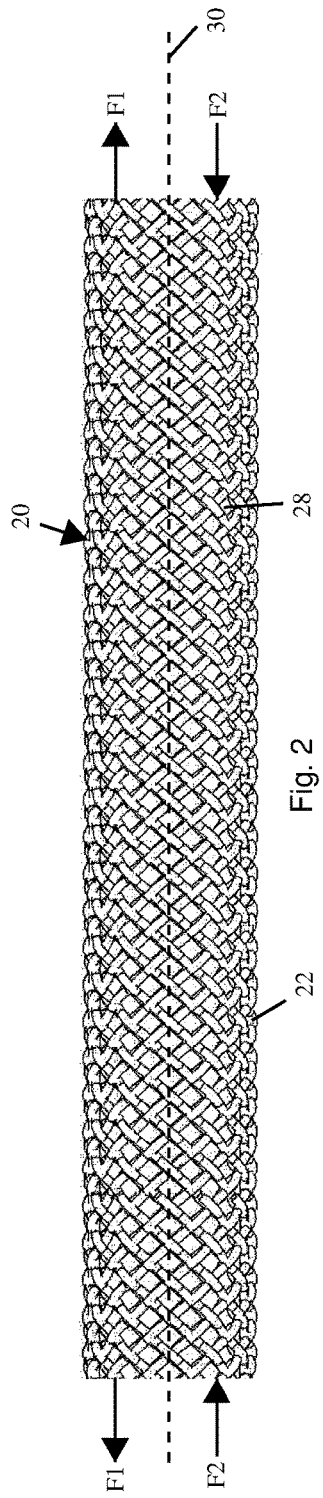
FIG. 2 is a side elevation view of the rope connection device illustrated in FIG. 1.
Figure 3:
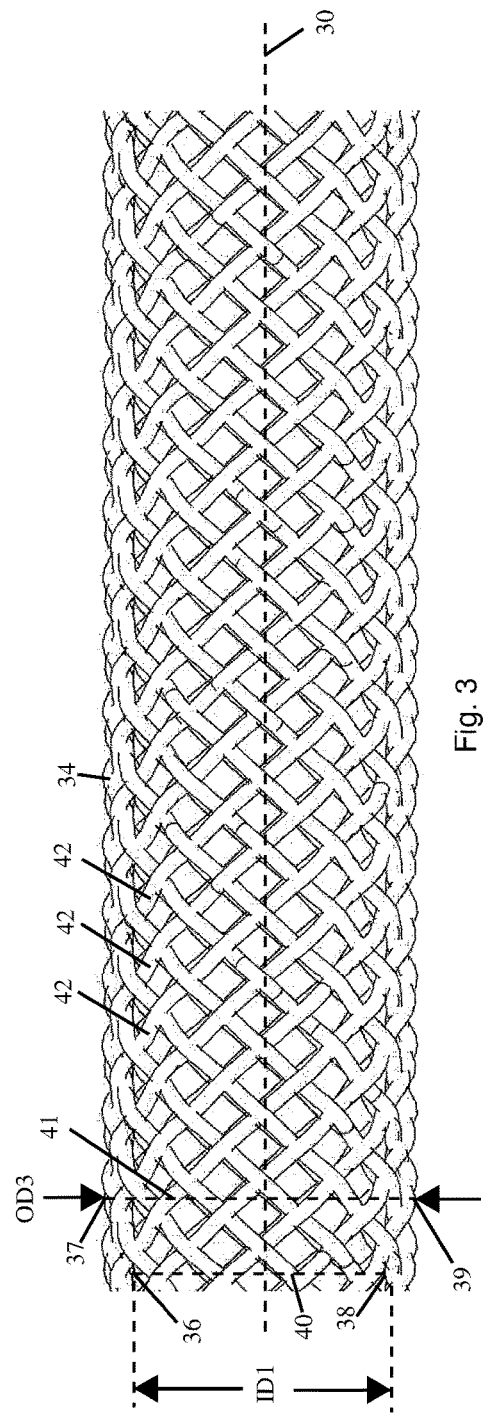
FIG. 3 is a side elevation view of an enlarged portion of the rope connection device illustrated in FIG. 2.

Referring to FIGS. 1 to 3, a rope connection system 10 (hereinafter the system) is configured to join a first rope 12 to a second rope 14. The system 10 may include a plurality of ropes including the first rope 12 and the second rope 14. The system 10 may further include a rope connection device 20 (hereinafter the device) configured to join two ropes, for example one of the plurality of ropes to another of the plurality of ropes, or the first rope 12 to the second rope 14.

The first rope 12 extends along a first rope axis 16, and defines an outer dimension OD1 measured along a straight line that perpendicularly intersects the first rope axis 16. The second rope 14 extends along a second rope axis 18, and defines an outer dimension OD2 measured along a straight line that perpendicularly intersects the second rope axis 18. As shown in the illustrated embodiment, the outer dimensions OD1 and OD2 are substantially equal. The plurality of ropes may include ropes with outer dimensions different than OD1 and OD2.

One or more of the plurality of ropes may include a structure fastened to an end of the rope to prevent fraying of the rope. According to one embodiment, the structure is a rope end cap configured to be installed onto the respective rope prior to inserting the respective rope into the device 20. The rope end cap may be configured to be installed on one of the first rope 12 or the second rope 14. Alternatively, the rope end cap may be configured to be installed on both the first rope 12 and the second rope 14. The rope end cap may be configured to be fastened through crimping, wrapping, adhesives, friction fit, etc.

The device 20 includes a device body 22 having a first end 24 and a second end 26 spaced apart along a longitudinal direction L. The device body 22 defines a length L1 measured from the first end 24 to the second end 26 along the longitudinal direction L. As shown in the illustrated embodiment, the device 20 may be elongate along the longitudinal direction L.

The device body 22 include a tubular shape that defines a through hole 28 that extends through the device body 22. The through hole 28 may extend along a device central axis 30. The device body 22 includes an inner surface 32, which faces the device central axis 30, and the device body 22 further includes an outer surface 34, which faces away from the device central axis 30. Thus, the inner surface 32 is positioned radially inward of the outer surface 34 with respect to the device central axis 30. The device body 22 defines an inner dimension ID1 measured from a first point 36 on the inner surface 32 to a second point 38 on the inner surface 32 along a straight line 40 that both intersects and is perpendicular to the device central axis 30. As shown in the illustrated embodiment, the inner dimension ID1 may be an inner diameter. The device body 22 defines an outer dimension OD3 measured from a first point 37 on the outer surface 34 to a second point 39 on the outer surface 34 along a straight line 41 that both intersects and is perpendicular to the device central axis 30. As shown in the illustrated embodiment, the outer dimension OD3 may be an outer diameter.

The device body 22 is configured to be such that the length L1, the inner dimension ID1, or both may change in response to a force applied to the device body 22. For example, the device body 22 may be configured such that a "pull" force F1 applied to both the first end 24 in a direction away from the second end 26, and to the second end 26 in a direction away from the first end 24 increases the length L1, decreases the inner dimension ID1, or both. The device body 22 may be configured such that a "push" force F2 applied to both the first end 24 in a direction toward the second end 26, and to the second end 26 in a direction toward the first end 24 decreases the length L1, increases the inner dimension ID1, or both.

The device body 22 may include a plurality of members 42, for example wires or wire strands. The plurality of members 42 may be wound at an angle relative to the device central axis 30. Each of the plurality of members 42 terminates at opposed first and second strand ends. Each of the first strand ends may be mechanically connected to each other, for example by a ring member. Additionally or alternatively, each of the second strand ends may be mechanically coupled together. Alternatively, each of the first strand ends may be spaced apart from and unconnected with the others of the first strand ends. Alternatively, the device body 22 may be monolithic.

Referring to FIG. 4, the system 10 may include an outer sleeve 50 configured to fit over top of the device 20 when the first rope 12 and the second rope 14 are positioned in the through hole 28. The outer sleeve 50 may be configured to increase friction between the device 20 and the first and second ropes 12, 14. The outer sleeve 50 may further be configured to decrease wear of the device 20, for example as the device 20 passes through sheaves and pulleys. The outer sleeve 50 includes an outer sleeve body 52 that, similar to the device body 22, is configured to be flexible such that a length of the outer sleeve 50, an inner dimension ID2 of the outer sleeve 50, or both are variable in response to a force applied to the outer sleeve 50. The outer sleeve body 52 may be configured such that in a relaxed state, with no outside force applied to the outer sleeve 50, the inner dimension ID2 is smaller than the inner dimension ID1. The outer sleeve body 52 may be configured such that the length of the outer sleeve 50 is greater than the length L1. Alternatively, the outer sleeve body 52 may be configured such that the length of the outer sleeve body 52 is either less than or equal to the length L1. According to one embodiment, the outer sleeve 50 is a shrink tube. According to another embodiment, the outer sleeve 50 is a helical wire, as shown in FIG. 4 with a partial cutout of the wire to provide visibility of the underlying elements.

Referring to FIG. 5, the device 20 may include a structure, such as a device end cap 60 attached to an end of the device body 22. The device end cap 60 may be configured to be connected to a respective one of the plurality of ropes after insertion of the respective one of the plurality of ropes into the through hole 28. Connection of the device end cap 60 to the respective rope may prevent accidental release of the respective rope from the device 20. The device end cap 60 may be configured to be crimped, adhered, or otherwise attached to the respective rope. The device 20 may include two device end caps 60, a first device end cap attached to the first end 24 and a second device end cap attached to the second end 26. The first device end cap may be configured to be connected to a first rope inserted into the through hole 28, and the second device end cap may be configured to be connected to a second rope inserted into the through hole 28.

Referring to FIG. 6, the device 20 may include a device end cap 60 having a biasing member 62, such as a spring. The biasing member 62 may be loaded with an initial force prior to connection of a second device end cap 60 to one of the plurality of ropes such that the spring is configured to maintain tension on the device body 22 and re-center the respective rope in the through hole 28 if relative slippage occurs.

As shown in the illustrated embodiment, the device end cap 60 can include a first member 64 configured to be fastened to the first rope 12 such that movement of the first member 64 relative to the first rope 12 is restricted, for example prevented without plastically deforming at least one of the first member 64 and the first rope 12. The device end cap 60 can further include a second member 66 coupled to the plurality of members 42. The device end cap 60 can include the biasing member 62 positioned between the first member 64 and the second member 66.

The device 20 can include two of the device end caps 60 with the first member 64 of one of the device end caps 60 configured to be fastened to the first rope 12, and the first member 64 of another of the device end caps 60 configured to be fastened to another rope of the system 10. The device 20 can be configured such that once both device end caps 60 are fastened, the biasing member 62 applies a force on the second member 66 biasing the second member 66 toward the first member 64 thereby increasing the length L1 of the device 20 and decreasing the inner diameter ID1 of the device 20. The decreased inner diameter ID1 can result in an increased force on the plurality of ropes within the through hole 28, thereby preventing removal of the plurality of ropes from the through hole 28.

Referring to FIGS. 1 to 6, the device 20 may define an assembled configuration and an unassembled configuration. In the unassembled configuration an entirety of the first rope 12 is positioned outside the through hole 28, an entirety of the second rope 14 is positioned outside the through hole 28, and the inner dimension ID1 is smaller than both the outer diameter OD1 of the first rope 12 and the outer diameter OD2 of the second rope 14. The device 20 defines an assembled configured in which a portion, for example the first end 13, of the first rope 12 is positioned in the through hole 28, a portion, for example the first end 15 of the second rope 14 is positioned in the through hole 28, and the inner dimension ID1 is greater than both the first outer diameter OD1 of the first rope 12 and the outer diameter OD2 of the second rope 14.

According to one embodiment, the device 20 is configured such that the device 20 will maintain the joining of the first rope 12 and the second rope 14 up to a maximum force. Maintaining the joining of the first rope 12 and the second rope 14 includes preventing plastic deformation of the device 20, movement of either or both of the first end 13 and the first end 15 from the through hole 28, or both. According to one embodiment, the device 20 may be configured such that the maximum force is about 75% of the maximum tensile strength of one of the first rope 12 and the second rope 14. According to one embodiment, the device 20 may be configured such that the maximum force is about 100% of the maximum tensile strength of one of the first rope 12 and the second rope 14.

According to one embodiment the device 20 the outer diameter OD3 of the device body 22 is between about 100% and 125% of the outer diameter OD1 of the first rope 12, and is between about 100% and 125% of the outer diameter OD2 of the second rope 14.

According to one embodiment, the system 10 may include friction enhancements such as an inner sleeve positioned in the through hole 28, for example against the inner surface 32, such that the inner sleeve is between the inner surface 32 and one or more of the ropes positioned in the through hole 28. The inner sleeve may include rubber, polymer, organic material, or any combination thereof. The device body 22 may include a high friction coating such as composite diamond coatings, electroless nickel silicon carbide, or other similar substances. The device body 22 may include a visual indicator showing the location of the center of the device body 22 between the first end 24 and the second end 26. The device body 22 may include an inner wall that extends from the inner surface 32 toward the device central axis 30, such that the inner wall is configured to provide a hard stop during the insertion of the rope into the through hole 28. The inner wall may be configured to block a portion, up to an entirety of the through hole 28 with respect to the longitudinal direction L.

In use, the system 10 is configured to join a first rope 12 to a second rope 14. A first end 13 of the first rope 12 is inserted into the through hole 28 and advanced until the first end 13 is positioned between the first end 24 and the second end 26 with respect to the longitudinal direction L, for example near a center of the device body 22. A first end 15 of the second rope 14 is inserted into the through hole 28 and advanced until the first end 15 is positioned between the first end 24 and the second end 26 with respect to the longitudinal direction L, for example near a center of the device body 22.

The first end 13 and the first end 15 may be abutting, or may face each other such that a gap is defined between them. According to one aspect of the disclosure, an entirety of the first rope 12 is offset from an entirety of the second rope 14 with respect to the longitudinal direction L. In other words, no portion of the first rope 12 overlaps with any portion of the second rope 14 with respect to the longitudinal direction L. The first end 13 and the first end 15 may be positioned within the through hole 28 such that the first rope axis 16 and the second rope axis 18 are aligned, or in other words collinear.

During insertion of the first rope 12, the second rope 14, or both a force may be applied to the device body 22 to increase the inner dimension ID1 from a first size to a second size. The first size may be smaller than the outer diameter of the first and second ropes OD1, OD2, and the second size may be larger than the outer diameters of the first and second ropes OD1, OD2. Once the first end 13 and the first end 15 are positioned inside the through hole 28 the force may be removed from the device body 22 allowing the inner dimension ID1 to reduce from the second size. The inner dimension ID1 may reduce to the first size, or may reduce until the inner dimension ID1 matches at least one of outer dimension OD1 of the first rope 12 and the outer dimension OD2 of the second rope 14.

Any force applied to either or both of the first rope 12 and the second rope 14 in a direction away from the other of the first rope 12 and the second rope 14 results in the length L1 of the device body 22 increasing and the inner diameter ID1 decreasing, thus increasing the friction force holding the first and second ropes 12, 14 in place within the through hole 28.

According to one aspect of the disclosure a kit is provided that includes a plurality of ropes and at least one of the devices 20 configured to join a first of the plurality of ropes to a second of the plurality of ropes.

It will be appreciated that the foregoing description provides examples of the disclosed system. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein. All methods described herein can be performed in any suitable order unless otherwise indicated herein or otherwise clearly contradicted by context.

Although the disclosure has been described in detail, it should be understood that various changes, substitutions, and alterations can be made herein without departing from the spirit and scope of the invention as defined by the appended claims. Moreover, the scope of the present disclosure is not intended to be limited to the particular embodiments described in the specification. As one of ordinary skill in the art will readily appreciate from the disclosure of the present invention, processes, machines, manufacture, composition of matter, means, methods, or steps, presently existing or later to be developed that perform substantially the same function or achieve substantially the same result as the corresponding embodiments described herein may be utilized according to the present disclosure.

What is claimed:

1. A system configured to join at least two ropes, the system comprising:
    a first rope that defines a first outer diameter;
    a second rope that defines a second outer diameter; and
    a device configured to join the first rope to the second rope, the device including a device body that extends from a first end to a second end along a central axis, the device body including an inner surface defining a through hole that extends through both the first end and the second end, the device body defining an inner dimension measured from a first point on the inner surface to a second point on the inner surface along a straight line that is both perpendicular to and that intersects the central axis,
    wherein the device defines an unassembled configuration in which: 1) an entirety of the first rope is positioned outside the through hole, 2) an entirety of the second rope is positioned outside the through hole, and 3) the inner dimension is smaller than both the first outer diameter and the second outer diameter,
    wherein the device defines an assembled configuration in which: 1) a portion of the first rope is positioned in the through hole, 2) a portion of the second rope is positioned in the through hole, and 3) the inner dimension is greater than both the first outer diameter and the second outer diameter, and
    wherein, the device maintains the joining of the first rope and the second rope up to a maximum force, the maximum force being at least 75% of a maximum tensile strength of one of the first rope and the second rope.

2. The system of claim 1, wherein the first rope defines a first rope axis, the first outer diameter is measured along a first line that perpendicularly intersects the first rope axis, the second rope defines a second rope axis, the second outer diameter is measured along a second line that perpendicularly intersects the second rope axis, and in the assembled configuration the first rope axis is collinear with the second rope axis.

3. The system of claim 1, wherein the first outer diameter is equal to the second outer diameter.

4. The system of claim 1, wherein the device body defines a length measured from the first end to the second end along the central axis, and the device body is configured such that the length is greater when the device is in the unassembled configuration than length when the device is in the assembled configuration.

5. The system of claim 1, wherein the device body includes a plurality of wires wound about the central axis at an angle relative to the central axis.

6. The system of claim 1, further comprising an outer sleeve defining a sleeve inner dimension, wherein the device body defines an outer dimension, and in the assembled configuration at least a portion of the device is positioned inside the outer sleeve such that the sleeve inner dimension is greater than the outer dimension.

7. The system of claim 6, wherein in the unassembled configuration the outer dimension is greater than the sleeve inner dimension.

8. The system of claim 1, wherein the device includes an end cap configured to be attached to the first rope in the assembled configuration such that movement of the end cap relative to the first rope is restricted.

9. The system of claim 8, wherein the end cap is a first end cap, the device includes a second end cap configured to be attached to the second rope in the assembled configuration such that movement of the second end cap relative to the second rope is restricted.

10. The system of claim 1, wherein the device includes a biasing member configured such that in the assembled configuration the biasing member exerts a force that reduces the inner dimension.

11. A method of joining a first rope to a second rope, the method comprising the steps of:
increasing an inner dimension of a device from a first size to a second size, the inner dimension measured from a first point on an inner surface of the device to a second point on the inner surface along a straight line that is both perpendicular to and that intersects a central axis of the device;
inserting a first end of a first rope into a through hole of the device, the through hole defined by the inner surface, the first rope defining a first outer dimension that is greater than the first size and smaller than the second size;
inserting a first end of a second rope into the through hole such that the first end of the first rope faces the first end of the second rope, the second rope defining a second outer dimension that is greater than the first size and smaller than the second size; and
reducing the inner dimension from the second size until the inner surface applies a force to each of the first rope and the second rope sufficient to prevent removal of each of the first rope and the second rope from the through hole, and
wherein, the device maintains the joining of the first rope and the second rope up to a maximum force, the maximum force being at least 75% of a maximum tensile strength of one of the first rope and the second rope.

12. The method of claim 11, wherein the increasing step includes the step of applying a push force to the device.

13. The method of claim 12, wherein the increasing step includes the step of decreasing a length of the device, the length measured from a first end of the device to a second end of the device along the central axis.

14. The method of claim 11, wherein the reducing step includes the step of applying a pull force to the device.

15. The method of claim 14, wherein the reducing step includes the step of increasing a length of the device, the length measured from a first end of the device to a second end of the device along the central axis.

16. The method of claim 11, further comprising the step of coupling a sleeve to the device such that a least a portion of: 1) the device, 2) the first rope, and 3) the second rope are each positioned within a through hole defined by the sleeve.

17. The method of claim 16, wherein the coupling step includes the steps of:
increasing an inner dimension of the sleeve, the inner dimension of the sleeve measured from a third point on an inner surface of the sleeve to a fourth point on the inner surface of the sleeve; and
reducing the inner dimension of the sleeve to thereby apply a force from the inner surface of the sleeve to the device.

18. The method of claim 11, further comprising the step of fastening an end cap of the device to the first rope such that movement of the end cap relative to the first rope is restricted.

19. The method of claim 18, wherein the end cap is a first end cap, the method further comprising the step of fastening a second end cap of the device to the second rope such that movement of the second end cap relative to the second rope is restricted.

20. The method of claim 19, further comprising, after the steps of fastening the first end cap and fastening the second end cap, the step of applying a force to both the first end cap and the second end cap, the force generated by a biasing member of the device.

* * * * *